D. E. ROSS AND O. GARRISON.
GEAR GRINDING MACHINE.
APPLICATION FILED JULY 14, 1917.

1,366,284.

Patented Jan. 18, 1921.
5 SHEETS—SHEET 4.

D. E. ROSS AND O. GARRISON.
GEAR GRINDING MACHINE.
APPLICATION FILED JULY 14, 1917.

1,366,284.

Patented Jan. 18, 1921.
5 SHEETS—SHEET 5.

UNITED STATES PATENT OFFICE.

DAVID E. ROSS, OF LA FAYETTE, INDIANA, AND ORLANDO GARRISON, OF DAYTON, OHIO; SAID ROSS ASSIGNOR TO SAID GARRISON.

GEAR-GRINDING MACHINE.

1,366,284.  Specification of Letters Patent.  Patented Jan. 18, 1921.

Application filed July 14, 1917. Serial No. 180,566.

*To all whom it may concern:*

Be it known that we, DAVID E. Ross and ORLANDO GARRISON, citizens of the United States, said DAVID E. Ross residing at La Fayette, in the county of Tippecanoe and State of Indiana, said GARRISON residing at Dayton, in the county of Montgomery and State of Ohio, have invented certain new and useful Improvements in Gear-Grinding Machines; and we hereby declare that the following is a full, clear, and exact description thereof, reference being had to the accompanying drawings, which form part of this specification.

This invention is a novel machine for grinding the teeth of gears, and its objects are to generate the teeth of open gears by grinding same with an emery wheel or other suitable disk grinder having its edge dressed to pressure angle of tooth to be generated.

In carrying out the invention the wheel is generated from a rack so that the teeth of the finished gears, when in mesh with each other, will have the same smooth true working mesh and action that a perfect gear would have if worked with a perfect straight rack.

To accomplish this each tooth in the gear is made to correspond to a tooth in a master rack, and each side of each tooth is equally and uniformly ground and generated in such manner that the teeth of the gear will have practically the desired theoretical rolling contact of rack teeth with a spur gear.

The invention provides novel means for adjusting the gear to be ground; novel means for operating the grinding wheel so that it will grind the teeth of the gear in the desired manner; novel means for adjusting the diamonds, or other means, so that the grinding wheel can be trimmed in exactly the desired manner; to provide micrometer adjustments and setting for the diamonds to compensate for wear on the grinding wheel and generate the periphery of the wheel to the form of the desired gear rack-tooth; and to provide novel means for adjusting the relative position of the grinding wheel to the stock or gear being ground so that the grinding wheel will operate on the gear being ground with the theoretical rolling contact or mesh of a straight rack with a spur gear.

We will explain the invention with reference to the accompanying drawings which illustrate one practical machine embodying the invention; and an understanding of the construction and method of operation thereof will enable others to readily adopt and use the invention; and summarize in the claims the essentials and novel features and combinations of parts for which protection is desired.

The machine as shown comprises a suitable base or body 1 provided at front with a support or guides 8 for a sliding table 7 which carries the work supporting and adjusting devices, hereinafter referred to, as well as the grinder and trimming devices.

This body 1 is provided with horizontally disposed guides for a longitudinally movable ram or sliding member 2 which carries the grinding wheel 180 and the devices for adjusting this wheel relative to the work, which will be hereinafter described.

Figure 4:
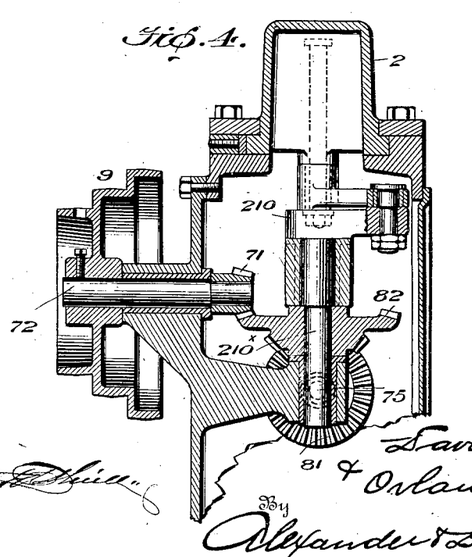
Fig. 4 is a reduced detail transverse section through the machine in the plane of the main driving shaft.

The ram 2 is adapted to be reciprocated toward and from the work support by any suitable means. As shown the ram has a depending wrist pin 88 to which is connected one end of a pitman 86, the other end of which is connected to a wrist pin 84 on a crank arm 210 on a shaft $210^x$, which is journaled in suitable supports within the frame, (see Figs. 1 and 4) to which shaft is attached a main bevel gear 82, meshing with a pinion 71 on a shaft 72 journaled in bearings in a bracket 80 attached to the main frame, which shaft may be driven by any suitable means, and is shown as provided with a cone pulley 9, that can be belted to any suitable driver.

The grinding wheel 180 is mounted on a spindle 25 which may be driven by any suitable means. As shown it is provided with a belt pulley 15 which may be driven from any suitable driver not shown. This spindle 25 is mounted in adjustable bearings 19 mounted in a bracket 3ª attached to a slide 3 which is mounted on the forward end of the ram 2, see Fig. 1, and carries nut 162 which is engaged by a screw 163 rotatably confined in the ram head by means of a collar 161 and dial 190, said screw may be rotated by means of a handle 188. The dial 190 is graduated, and an indicating finger 191 is attached to the ram adjacent said dial.

Figure 2:
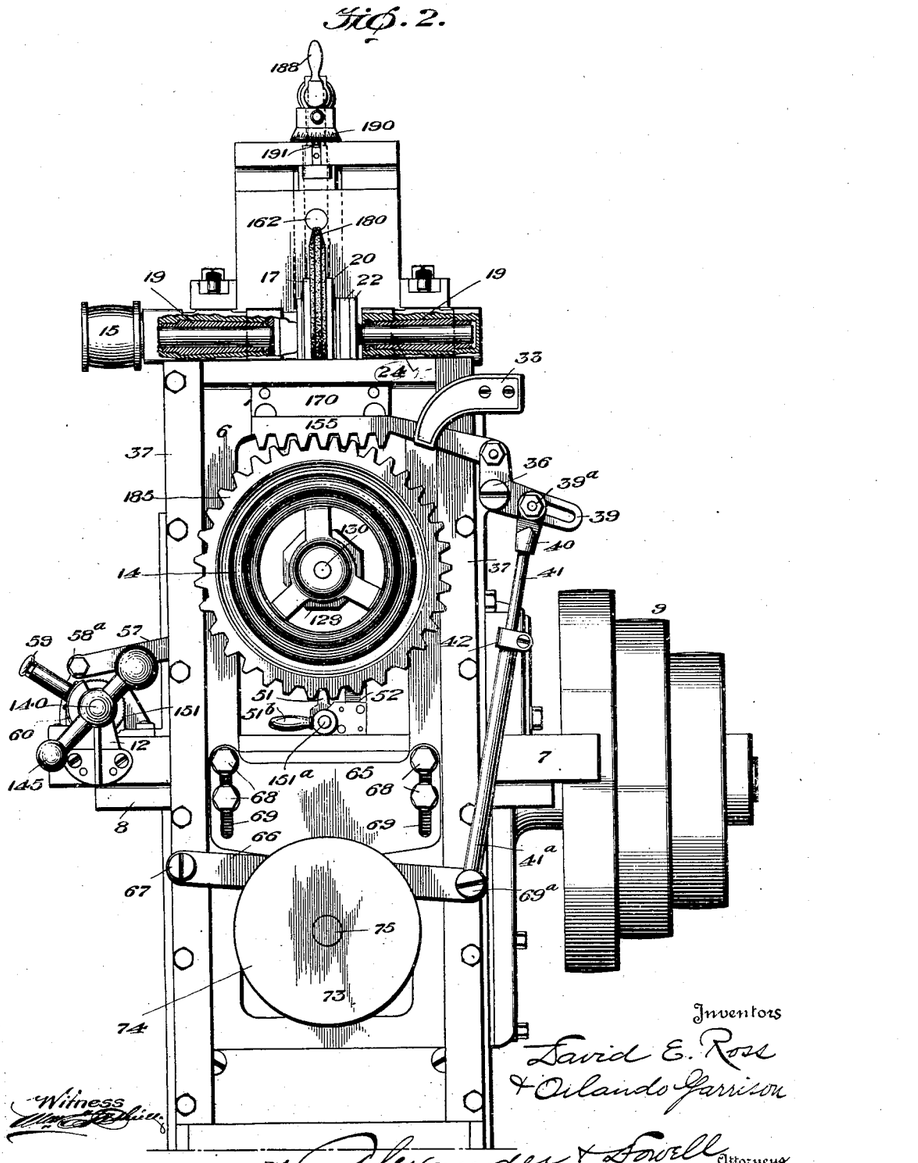
Fig. 2 is an enlarged front elevation of Fig. 1, partly in section.

The grinding wheel 180 is preferably adjustably and removably secured on the spindle 25 between opposed disks 17 and 20, the former being seated against a shoulder on the shaft and forced toward the disk 17 by means of clamp-nuts 22, (see Fig. 2). The bearings are preferably adjustable so that the spindle can be alined with the utmost accuracy and truth in its bearings. The wheel may be raised or lowered by turning the screw 163.

We propose to use a grinding wheel of sufficient thickness for grinding coarsest pitch gear likely to be required. Should the operator for any reason wish to use a thinner grinding wheel, washers of sufficient thickness can be inserted between disk 17 and the wheel to bring the center of the working edge of the wheel to the center of work spindle.

The sides of wheel 180 are dressed to the pressure angle of the gear to be generated. The face or width of wheel at periphery should be dressed to suit the gear being generated and the edge of the wheel in cross section should be a duplicate of a rack tooth of the desired pitch and pressure angle.

The gears to be ground are mounted upon a work spindle 135 (Fig. 1) which is preferably mounted in a head or bracket 4 on a sliding work table 7 mounted on the main frame beneath the grinding wheel and movable transversely of the main frame. This spindle preferably carries on its inner end an expansible split bushing 125 which is internally tapered to fit over an externally tapered inner end of the spindle 135, and this split bushing may be moved longitudinally of the spindle, so as to cause it to expand or contract by means of the rod 130 extending through the spindle and having a hand wheel 14 on its outer end. The rod 130 has a threaded engagement with one end of the bushing 125 so that by turning the wheel 14 and rod 130, the bushing will be moved longitudinally on the spindle and thus will expand or contract sufficiently to firmly bind and at the same time truly center the gears G G on the spindle.

On the outer end of the spindle is a master or pattern gear 185, which should be an exact duplicate of the gear to be ground, and which may be removably secured on the spindle in any suitable manner so that it cannot rotate thereon; it is shown as secured by a nut 129. To place the master-gear 185 in position it is necessary to first remove the hand wheel 14, which can be easily done.

The master wheel 185 is adapted to be locked by a shot-bolt 170 attached to a slide 6, which is vertically movable in guides 37 attached to the main frame in front of the guide 8. The slide 6 is bifurcated or slotted so that it will not interfere with the spindle 135 and the parts connected therewith, said slide 6 extending below the spindle. Attached to the upper end of slide 6 is a shot-bolt or latch 170 which is adapted to engage the teeth of the master gear 185.

A plate 65 is adjustably attached to the lower end of slide 6 by means of bolts 68 and slots 69 (Figs. 1 and 2) so that the plate 65 may be adjusted toward or from the shot-bolt 170 in order that shot-bolt may be properly engaged with gears 185 of different diameters.

The plate 65 carries a roller 153 which engages with a race cam 74 attached to a shaft 75 suitably journaled in the main frame beneath guide 8, and said cam is adapted to raise and lower the shot-bolt slide at the proper time. The shaft 75 has on its inner end a bevel gear 81 which meshes with a bevel gear 82ª formed with or attached to the underside of the main gear 82 on the shaft 210ˣ.

Mounted to lie beside the shot-bolt 170 is an index-pawl or rack 155 which is slidably supported by a bracket 33; and its outer end is pivotally connected to one arm of a bell crank lever 39 which is pivoted at 36 on an adjacent fixed support, as guide 37, and the other arm of lever 39 is adjustably connected by a slot and bolt connection 39ª to the upper end 40 of a connecting rod preferably composed of upper and lower members 41 and 41ª which are telescoped and may be locked together when adjusted by means of a clamp 42. The connecting rod might be of any suitable construction but is preferably made adjustable to enable the machine to be readily operated with great accuracy on different sized gears. The lower end of the rod 41 is pivotally connected at 69ª to the free end of a lever 66 lying beside cam 74 and pivoted at 67 on the frame, and this lever 66 carries a roller 149 which engages a race cam 73 fixed on the shaft 75 beside cam 74.

On each return stroke of ram and immediately after the grinding wheel is clear of the gear being ground, the shot bolt 170 is lifted and held disengaged from master-gear 185, by the action of the cam 74 until, through action of cam 73, index pawl 155 has caused the master-gear 185 to rotate one tooth. Cam 73 is so timed that immediately after shot-bolt 170 is withdrawn from the master-gear it begins to move the index pawl 155 and causes the master gear and gears G to turn until the grinding wheel on its forward stroke is about to engage the gears being ground. At this time cam 73 has completed its cycle and cam 74 (which has held shot-bolt 170 disengaged during indexing) moves the shot-bolt 170 again into engagement with master-gear 185, thus causing perfect location of the tooth to be ground.

Figure 5:
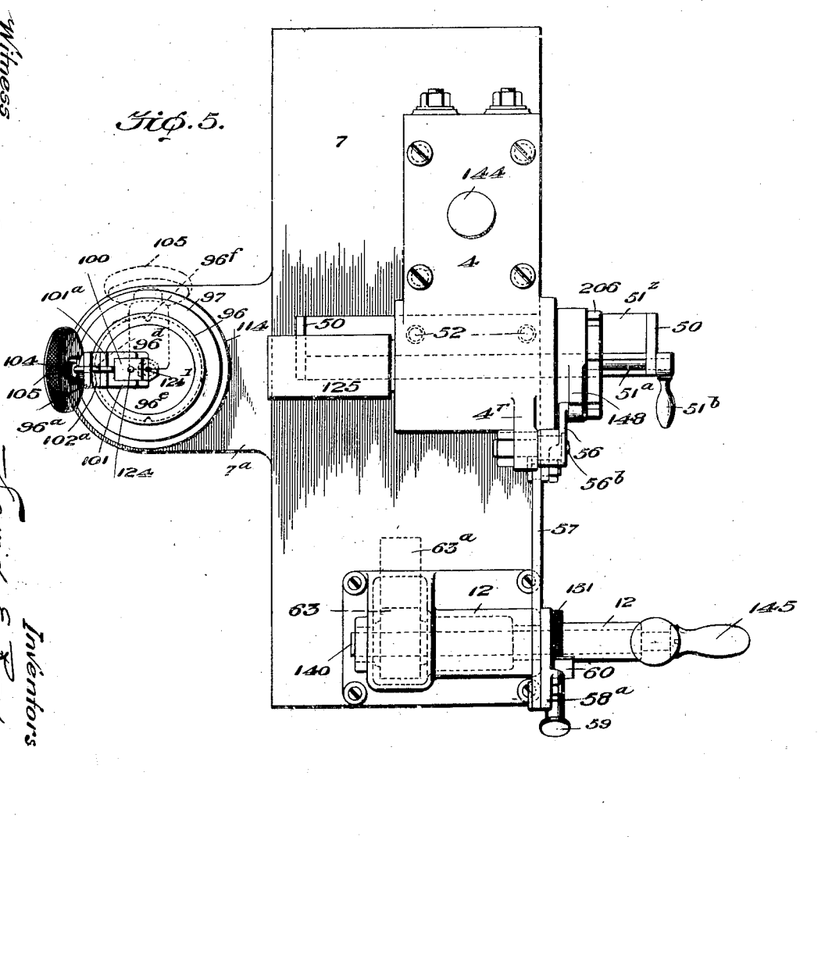
Fig. 5 is a detail plan view of Fig. 2, with parts removed.
Figure 6:
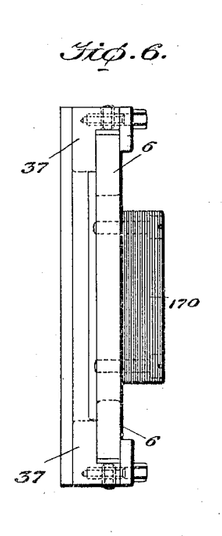
Fig. 6 is a detail of the shot bolt and guide.

On the spindle 135 is a cam 148 (see Figs. 5 and 8) which is adapted to engage a roller 56$^a$ on the short arm of a lever 56 pivoted upon a stud or bolt 56$^b$ on a lug 4$^r$ on the housing 4. The long arm of the lever 56 is connected by a link 57 to an oscillating lever 58$^a$ which is pivotally mounted on a ratchet feed shaft 140 journaled in suitable bearings 12 on the slide 7.

Keyed on this shaft 140 beside the lever 58$^a$ is a preferably spring-actuated pawl-bolt 59 (see Figs. 2, 3, 8) engaging a ratchet 151 on shaft 140. Adjacent the pawl and surrounding the shaft is a ratchet pin gage 60 of usual construction and adjustable to regulate the amount of longitudinal travel of slide 7, imparted by the pawl-bolt 59.

Figure 8:
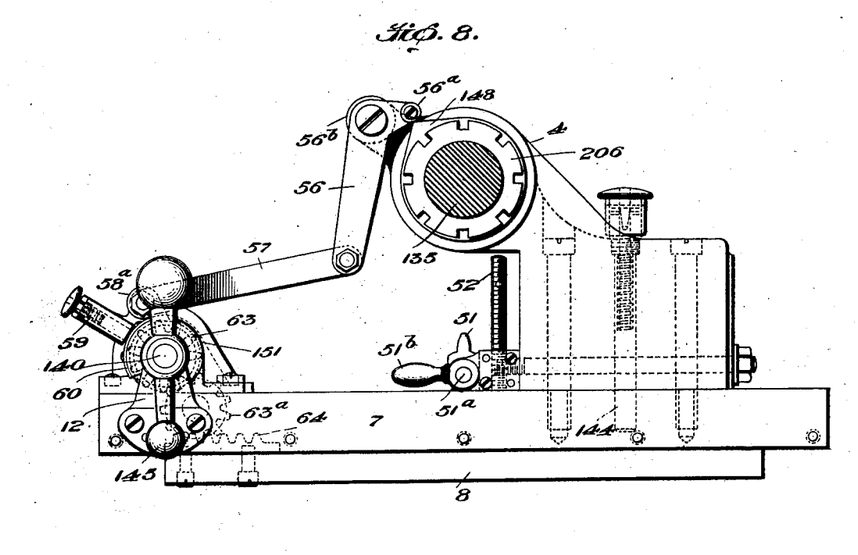
Fig. 8 is a front elevation of Fig. 5.

On the shaft 140 is keyed a pinion 63 which meshes with an intermediary 63$^a$ journaled on a stud attached to the slide 7; and 63$^a$ meshes with a rack 64 on the guide 8, (Fig. 8). The shaft 140 may be turned by a handle 145 to advance or retract the slide 7 on the guide 8 transversely of the main frame, and thus retract or adjust the master and gears mounted on the spindle 135 transversely of the frame and axially of the grinding wheel 180.

The slide 7 is caused to travel, or be "indexed," from right to left, once during each revolution of cam 148, by the action of lever 56, link 57, ratchet pin 59, ratchet wheel 151, gears 63 and 63$^a$ and rack 64.

Figure 3:
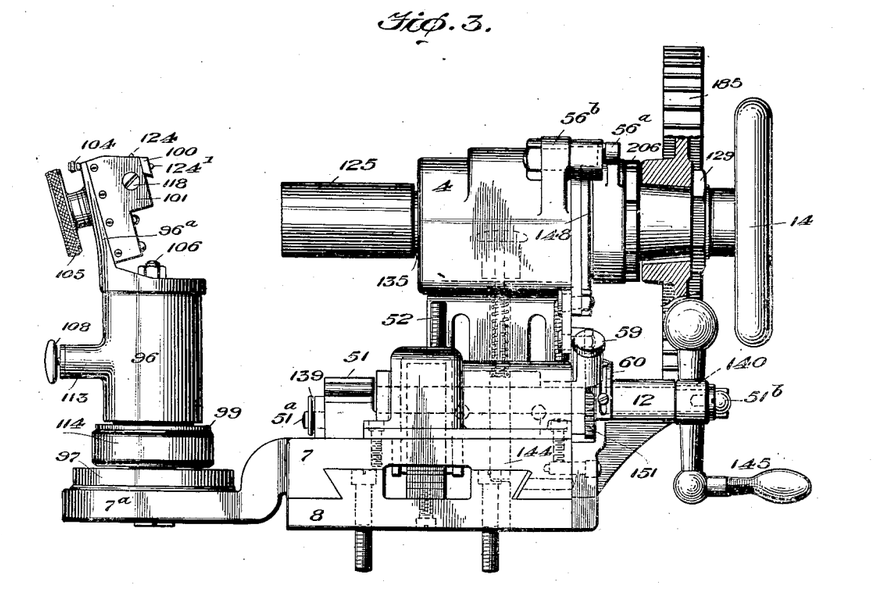
Fig. 3 is an enlarged side elevation of the gear supporting devices, and diamond adjusting devices.

The gage 60 applied to bracket 12 extends over the edge of bracket and part way around ratchet wheel. By adjusting the gage to right, it will lie in the path of the ratchet pin and prevent its engaging with teeth in ratchet wheel at the beginning and for any desired portion of the forward or working stroke of the ratchet pin. This longitudinal adjustment or indexing is performed at the same time that the rotary adjustment or indexing is being performed. The gage 60 can be adjustably secured to the bracket 12 by a slot and screw as shown in Fig. 3.

Mounted on the slide 7 is an alining gage adapted to engage the teeth of the gears on the spindle 135 and aline them with the teeth of the master gear. This alining gage is pivoted on and between plates 50 and 50$^a$ attached to a support 51$^x$ and has an inner tooth 51 adapted to engage the gears G G, and an outer tooth 51$^a$ adapted to engage the teeth of the master gear (see Fig. 1). The gage is provided with an operating finger 51$^b$ and is held in normal position by means of a spring 139 (see Fig. 7) on its inner end. To compensate for variation in diameter of gears due to expansion or distortion, the inner plate 50 may have an elongated slot to permit the spring to act. The outer tooth of gage meshes in master gear as a one tooth pinion would. The gage is automatically rolled out of mesh with the gears when the machine is started, due to the gears rotating clock wise. The alining gage may be raised or lowered to suit different diameters of gears by means of adjusting screws 52 engaging the gage support 51$^z$.

*Grinding wheel truing devices.*

The slide 7 has a rearward extension or bracket 7$^a$ on which are mounted the devices for dressing the grinding wheel. A side dressing diamond 124 and an edge dressing diamond 124$^1$ are mounted respectively on the top and end of a slide 100, which is mounted to move horizontally in a guide 101 that is attached to a slide 101$^a$, which is guided in a bracket 96$^a$ attached to upper end of tubular support 96, which is rotatably mounted upon a sleeve 98, which is rotatably mounted on a nut 114, screwed on a standard 97$^a$, said sleeve 98 having a flange on its lower end engaging an annular recess in the nut 114 and confined thereto by an annulus 99 secured by screws 121. The standard 97$^a$ has a base 97 mounted upon the bracket 7$^a$ and secured by a nut 116 and pin 115. The support 96 is yieldingly held down upon the sleeve 98 by means of a spring 109 strung on a rod 106 extending into the standard 97$^a$ and connected with a cap 107 on the upper end of the support 96. By rotating the nut 114, the sleeve 98 and the wheel dressing devices thereon can be raised or lowered. The sleeve is prevented from rotating on the standard 97$^a$ by means of a key 108 engaging corresponding slots in the sleeve and standard as shown so as to permit the sleeve and support to be raised on the standard, but the sleeve cannot rotate thereon. The support 96, however, may be turned on the sleeve to bring the diamond 124$^1$ into positions to engage either side of the grinder wheel 180. For this purpose the sleeve may be provided with notches 96$^d$, 96$^e$, 96$^f$ (see Fig. 5) arranged at the proper points, with any one of which the pin 113 may be engaged.

The slide 100 may be adjusted by means of a screw 104 and clamped by screw 118. The slide 102 may be adjusted by a rack 102ª on the slide engaging a pinion 103ᵇ on the shaft 103 of a hand wheel 105.

Pin 108 is engaged with a notch 96ᵈ only when setting diamond 124 to height. Pin 108 must be either in slot 96ᵉ or 96ᶠ when used for dressing either sides or periphery of wheel. Diamonds after once set, require adjustment only occasionally to compensate for amount worn off diamond.

Operations.

*To dress outside diameter of wheel.*—Place pin 113 in either right or left slot in sleeve 98. Screw wheel head 3 down until grinder wheel 180 touches diamond 124; pass diamond back and forth by revolving handle 145 and continue to lower wheel to diamond until the O. D. of the grinding wheel is in perfect condition.

*To set diamond #124¹ and dress sides of wheel.*—After the O. D. of wheel is dressed, move slide 7 with handle 145 until locating pin 144 enters hole in guide 8. Raise dresser slide 102 with hand wheel 105 until diamond 124¹ is opposite side of grinding wheel, then adjust diamond 124¹ against grinding wheel by adjusting screw 104; raise and lower once or twice; then turn dresser to opposite side of wheel and locate pin in slot. Raise and lower diamond as before and continue to adjust same until width of grinding wheel is correct for pitch to be ground.

*To locate gears.*—Mount the gears on work spindle 135 over expansion bushing 125. Locate tooth space of gear, to be ground, in perfect alinement with tooth space in master or index gear 185 (which is a duplicate of the gear to be ground) by throwing alinement gage 51 in mesh with both the index gear 185 and the gears to be ground.

Figures 1, 7:
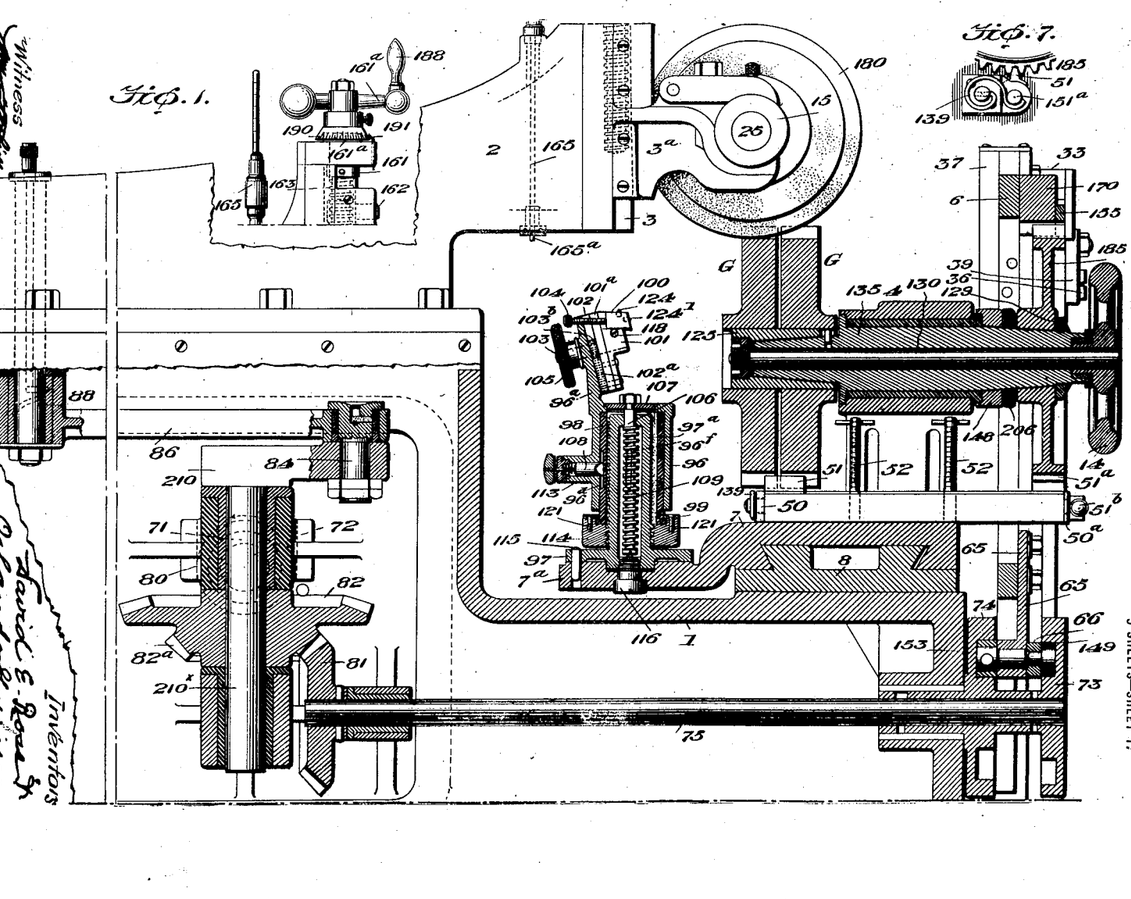
Figure 1 is a longitudinal sectional elevation of a machine embodying the invention, partly broken away.
Fig. 7 is a detail of the alining gage.

If desired two gears may be treated simultaneously as indicated in Fig. 1 if their total face width does not extend the capacity of the machine.

In the ram 2 and above and adjacent the grinding wheel 180 there is a micrometer gage 165 of any suitable construction for a purpose hereinafter explained.

The slide 7 carries an index pin 144 (see Figs. 5 and 8) which is adapted to be engaged with an index or hole in guide 8, when the slide 7 is in true central position and lock the slide 7 on guide 8.

Summary of operations for setting up and grinding teeth of 64 T-8P gear.

*To prepare grinding wheel.*—First determine the root radius of gear which in this example would be 3.8554, the distance from center of work spindles to lower edge of wheel. Then proceed as follows:

(1) Set micrometer 165 to 3.8554; (2) Advance ram to end of forward stroke; this will bring end of micrometer bar directly over diamond 124 when index pin 108 of dressing device is in slot 96ᵈ; (3) Raise diamond 124 to contact with end of micrometer bar by revolving nut 114; (4) Turn support 98 until pin 108 engages slot 96ᵉ; (5) Move ram 2 to extreme inner position; this will bring center of wheel directly over diamond 124; leave ram in this position until wheel is dressed on periphery and sides; (6) Turn handle 188 to bring wheel down to diamond; and move diamond back and forth under wheel by turning handle 145; continue to shift wheel 180 down until its periphery is perfectly dressed; (7) Turn handle 145 to bring slide 7 to central position and insert index pin 144 into index hole in part 8; (8) Move diamond 124¹ over to wheel by turning screw 104; then turn hand wheel 105, and move diamond up and down sides of wheel; then turn the support to move diamond to opposite side of wheel and engage pin 108 in slot 96ᶠ and move the diamond up and down. Continue reversing diamond from side to side of wheel and adjusting diamond until wheel is of proper width on face.

To redress wheel on account of wear operate thereon in same manner and dress wheel on sides and periphery. The index pin 144 should be engaged with guide 8 when dressing sides of wheel to insure that the wheel is absolutely central or in line with the work spindle. Original setting of diamonds will dress wheel to proper width and angle without any measuring, except for wear of diamonds which will be negligible.

To locate and grind gears.

Move slide 7 to right hand side for loading. Mount the gears to be ground on bushing 125 of work spindle 135. Turn alinement gage to right and into engagement with teeth of master gear, and gear to be ground, and tighten hand wheel 14 to lock gears on the spindle 135.

Then move slide 7 to left until gears are near line of travel of wheel. Turn work spindle by hand to left until cam 148 is under roller on lever 56. Ram 2 should always be at rear end of stroke when stopped and while loading. Plate 65 should have been adjusted so that shot-bolt 170 will be directly engaged with the master gear; then machine is ready to start.

In starting ram 2 moves forward, and cam 73 will cause pawl 155 to complete indexing of work spindle and gears, and cam 74 will cause shot-bolt to enter and exactly locate the master gear and gears being ground, before the grinding wheel comes in contact with gears G. The ram 2 moves the grinding wheel forward and back through the gears G. Just as the grinding wheel clears gear G, cam 74 causes shot-bolt 170 to be raised out of master-gear 185 and then cam 73 causes pawl 155 to rotate master gear 185 one tooth. Then cam 148, through lever 56, link 57, ratchet wheel 151, gears 63 and rack 64, causes slide 7 to be moved to the left, an amount determined by adjustment of ratchet-pin-gage 60; then after rotary and longitudinal indexing is completed, cam 74 again brings shot-bolt 170 into master-gear 185 and holds it while grinding is being done.

Immediately upon starting machine, ram 2 starts forward. Indexing-pawl 155 completes indexing of master gear 185 and rack shot-bolt 170 is meshed into same by the action cam 74, operating slide 6; all of which is completed before wheel touches gear to be ground. Slide 7 is set to extreme right of machine when loading and unloading and is then fed to left manually by handle 145 until wheel touches gear to be ground, after which it is fed to left after each revolution of gear being ground by the action of cam 148, transmitting motion to index lever 56 and through connecting bar 57 to ratchet wheel 151, through shaft 140, gears 63 and rack 64, which rack is mounted rigidly on stationary guide 8. The cycles of operation are repeated, notary indexing being performed at each reciprocation of ram and the longitudinal indexing taking place once for each revolution of the master-gear. Longitudinal indexing determines the number of cuts made to a tooth and the number of revolutions gears will have made when completed. Cams 73 and 74 are caused to revolve continuously but are so formed that they only transmit motion as required to perform the functions above specified, and in accordance with the movements of the ram.

Number of cuts through gear is regulated by adjustment of gage 60 which will allow ratchet pin 58 to move ratchet wheel 151 only one or more teeth as desired. One shot bolt 170, one index pawl 155 and one alining gage 51 are required for each pitch of teeth, and one master-gear 185 for each number of teeth.

In the operation of this machine the teeth of the gear are gradually ground to the desired form; beginning by making the first grinding operation on say the left hand side of one tooth of the gear (looking at the machine from the front as in Fig. 2) and then similarly grinding each successive tooth of the gear until all the teeth thereof have been thus ground and the gear turned one complete revolution and the cam 148 will, through the described connections, move slide 7 slightly to the left, the extent of such movement being determined by the number of teeth of ratchet 151 exposed by the gage 60. At the next successive operation on each tooth it is ground at a slightly different point. Such cycles of operations continue in succession until each tooth has been properly ground throughout and the slide 7 moved to its extreme position to the right; and consequently by and during such successive cycles of operations each gear tooth will be ground until it has practically exactly the form that theoretically perfect teeth should have; and will in operation have the same smooth true working mesh and action that a perfect gear would have if worked with a perfect straight rack. The number of different successive grinding operations or cuts made by the grinding wheel on each tooth will depend upon the extent of movement imparted to the slide 7 by the devices operated by the cam 148 for each rotation of the master gear, such movement being greater or less according to the adjustment of the gage 60 to allow more or less of the rack teeth 151 to be engaged by the pawl 59.

We do not herein claim the means for dressing the grinding wheel, which forms the subject matter of a divisional application.

What we claim is:

1. In a gear grinding machine, the combination of a grinding wheel, means for supporting a gear to be ground at right angles to said grinding wheel, means for causing relative reciprocatory movement of the grinding wheel and the gear during the grinding operation, a master gear on said supporting means, means for alining the gear to be operated upon with the master gear, and means for locking the master gear during the grinding operation.

2. In a gear grinding machine, the combination of a grinding wheel, means for supporting a gear to be ground at right angles to said grinding wheel, means for causing relative reciprocatory movement of the grinder and the gear during the grinding operation, a master gear on said supporting means, means for alining the gear to be operated upon with the master gear, means for locking the master gear during the grinding operation, and means for turning the gears one tooth between grinding operations.

3. In a gear grinding machine, the combination of a grinding wheel, means for supporting a gear to be ground at right angles to said grinding wheel, means for causing relative reciprocatory movement of the grinding wheel and the gear during the grinding operation, a master gear on said supporting means, means for alining the gear to be operated upon with the master gear, means for turning the gear one tooth in the interval between grinding operations, and means for slightly displacing the gear being ground relative to the grinding wheel for each rotation of the gear being ground.

4. In a gear grinder, the combination of a grinding wheel, means for reciprocating said wheel while being rotated, means for supporting a gear to be ground, a master gear on said supporting means, means for alining the gear to be operated upon with the master gear, cam actuated means for locking the master gear during the grinding operation, and cam actuated means for turning the gears one tooth in the interval between grinding operations.

5. In a gear grinding machine, the combination of a grinding wheel, means for reciprocating said wheel while being rotated, means for supporting a gear to be ground, a master gear on said supporting means, means for locking the master gear during the grinding operation, means for turning the gears one tooth in the interval between grinding operations, and means for slightly relatively displacing the gears and grinding wheel for each revolution of the gear being ground.

6. In a gear grinding machine, the combination of a grinding wheel, means for reciprocating said wheel while being rotated, means for supporting a gear to be ground, a master gear on said supporting means, means for alining the gear to be operated upon with the master gear, cam actuated means for locking the master gear during the grinding operation, cam actuated means for turning the gears one tooth in the interval between grinding operations, and means for slightly relatively displacing the gears and grinding wheel for each revolution of the gear being ground.

7. In a gear grinding machine, the combination of a grinding wheel, means for reciprocating said wheel while being rotated, a rotatable support for a gear to be ground, a master gear on said support, means for locking the master gear during the grinding operation, means for turning the gear one tooth for each reciprocation of the grinding wheel and means for producing lateral movement of the gear relative to the grinding wheel, substantially as described.

8. In a gear grinding machine, the combination of a grinding wheel, means for reciprocating said wheel while being rotated, a rotatable support for a gear to be ground, a master gear on said support, means for alining the gear to be operated upon with the master gear, cam actuated means for locking the master gear during the grinding operation, cam actuated means for turning the gear one tooth for each reciprocation of the grinding wheel, and means for producing lateral movement of the gear relative to the grinding wheel, substantially as described.

9. In a gear grinder, the combination of a reciprocating member, a grinding wheel rotatably and adjustably mounted thereon, a transversely movable slide, means thereon to carry a gear to be ground, means for locking the gear while being ground, and means for slightly relatively displacing the gear and grinding wheel in the interval between successive grinding operations on a tooth of the gear.

10. In a gear grinder, the combination of a reciprocating member, a grinding wheel rotatably and adjustably mounted thereon, a transversely movable slide, means thereon to carry a gear to be ground, means for locking the gear while being ground, means for turning the gear one tooth after each grinding operation, and means for slightly relatively displacing the gear and grinding wheel for each revolution of the gear being ground in the interval between successive grinding operations on a tooth of the gear.

11. In a gear grinder, the combination of a reciprocating member, a grinder thereon; a transversely movable support to carry a gear to be ground, a master gear mounted on said support, means for locking the master gear, and means for rotating the master gear.

12. In a gear grinder, the combination of a reciprocating member, a grinder thereon; a transversely movable support adapted to carry a gear to be ground, a master gear mounted on said support, means for locking the master gear, means for rotating the master gear, and means for slightly relatively displacing the gear and grinder for each revolution of the gear being ground.

13. In a gear grinder, the combination of a reciprocating member, a grinding wheel rotatably and adjustably mounted thereon adapted to carry a gear to be ground, a master gear mounted on said support, means for lining the gear with the master gear, cam actuated means for locking the master gear, and means for rotating the master gear.

14. In a gear grinder, the combination of a reciprocating member, a grinding wheel rotatably and adjustably mounted thereon; a transversely movable slide, a gear support mounted thereon to carry a gear to be ground, a master gear mounted on said support, means for alining the gear with the master gear, means for locking the master gear, means for rotating the master gear, and means for slightly relatively displacing the gear and grinding wheel for each revolution of the gear being ground.

15. In a gear grinder, the combination of a reciprocating member, a grinder mounted thereon, a transversely movable support for the gear to be ground; a master gear mounted on said support, a shot bolt for locking the master gear, cam actuated means for operating the shot bolt, an index pawl engaging the master gear, and cam actuated means for operating the index pawl.

16. In a gear grinder the combination of reciprocating member, a grinder mounted thereon, a transversely movable support for the gear to be ground; a master gear mounted on said support, means for alining the gear with the master gear, a shot bolt for locking the master gear, means for operating the shot bolt, an index pawl engaging the master gear, means for operating the index pawl, and means for slightly relatively displacing the gear and grinding wheel for each revolution of the gear being ground.

17. In a gear grinder, the combination of a reciprocating member, a grinder mounted thereon, a transversely movable slide, a rotatable gear support thereon adapted to carry the gear to be ground, a master gear mounted on said support, a shot bolt for locking the master gear, means for operating the shot bolt, an index pawl engaging the master gear, means for operating the index pawl, and means operated by the rotatable gear support for moving said slide and gears laterally.

18. In a gear grinder the combination of a reciprocating member, a grinding wheel rotatably and adjustably mounted thereon, a transversely movable slide, a support mounted thereon adapted to carry a gear to be ground; a master gear mounted on said support, means for alining the gear with the master gear, a shot bolt for locking the master gear, cam actuated means for operating the shot bolt, an index pawl engaging the master gear, and cam actuated means for operating the index pawl.

19. In a gear grinder, the combination of a reciprocating member, a grinding wheel rotatably and adjustably mounted thereon, a transversely movable slide, a support mounted thereon to carry a gear to be ground; a master gear mounted on said support, means for alining the gear with the master gear, a shot bolt for locking the master gear, cam actuated means for operating the shot bolt, an index pawl engaging the master gear, cam actuated means for operating the index pawl, and means for slightly relatively displacing the gear and grinding wheel for each revolution of the gear being ground.

20. In a gear grinder the combination of a reciprocating member, a grinding wheel rotatably and adjustably mounted thereon, a transversely movable slide, a rotatable gear support mounted thereon adapted to carry the gear to be ground, a master gear mounted on said support, a gage for alining the gear with the master gear, a shot bolt for locking the master gear, cam actuated means for operating the shot bolt, an index pawl engaging the master gear, cam actuated means for operating the index pawl, a cam on the rotatable gear support, and means operated by said cam for moving said slide and gears laterally.

21. In a gear grinder, the combination of a grinding wheel, means for reciprocating said wheel while being rotated, means for supporting a gear to be ground, a master gear on said supporting means, means for locking the master gear during the grinding operation, means for turning the gears one tooth in the interval between grinding operations, and means for rotatorially varying the angle of the teeth to the grinder between the successive series of grinding operations, substanitally as described.

22. In a gear grinder, the combination of a reciprocating member, a grinding wheel rotatably and adjustably mounted thereon, a transversely movable slide, means thereon to carry a gear to be ground, means for locking the gear while being ground, means for turning the gear one tooth after each grinding operation, and means for rotatorially changing the inclination of the teeth of the gear to the grinder in the interval between successive series of grinding operations, substantially as described.

23. In a gear grinder, the combination of a reciprocating member, a grinding wheel rotatably and adjustably mounted thereon, a transversely movable slide, means thereon to carry a gear to be ground, a master gear mounted on said support, means for locking the gear while being ground, means for turning the gear one tooth after each grinding operation, and means for rotatorially changing the inclination of the teeth of the gear to the grinder in the interval between successive series of grinding operations, substantially as described.

In testimony that we claim the foregoing as our own, we affix our signatures.

DAVID E. ROSS.
ORLANDO GARRISON.